(No Model.)
C. R. PRATT,
BRAKE AND STARTER FOR MACHINERY.
No. 444,102. Patented Jan. 6, 1891.
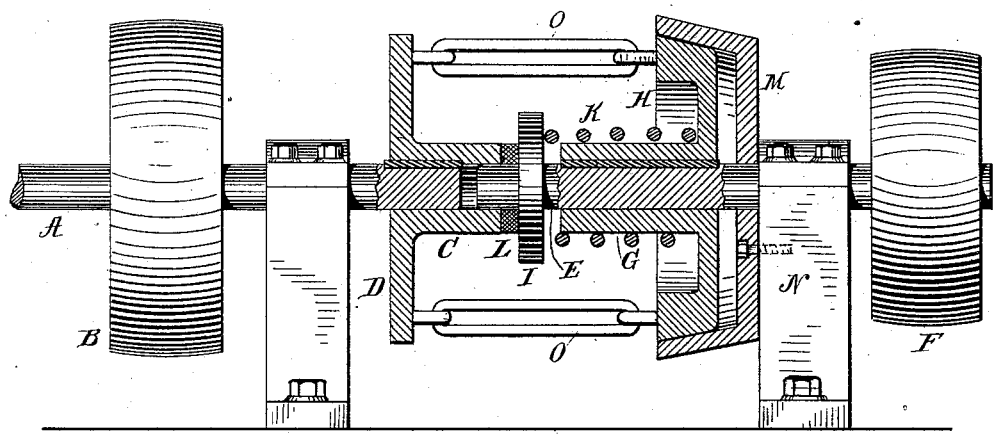
WITNESSES:
INVENTOR
Charles R. Pratt
BY ATT'YS.

UNITED STATES PATENT OFFICE.

CHARLES R. PRATT, OF NEW YORK, N. Y.

BRAKE AND STARTER FOR MACHINERY.

SPECIFICATION forming part of Letters Patent No. 444,102, dated January 6, 1891.

Application filed January 31, 1890. Serial No. 338,799. (No model.)

*To all whom it may concern:*

Be it known that I, CHARLES R. PRATT, a citizen of the United States, residing at New York city, in the county and State of New York, have invented a certain new and useful Improvement in Brakes and Starters for Machinery, of which the following is a specification.

The object of my invention is to provide simple and effective apparatus by means of which the power applied to start a driven machine may be applied gradually and the strain of starting thereby removed from the driving-motor, and by which the driven machine will be automatically braked in stopping the same, the brake being removed by the operation of starting the machine.

In accomplishing the above-named objects I make use of a loose link-connection between the driving-shaft and the driven shaft, so that the connection between them is one which yields torsionally, and the first application of power has the effect merely to twist the links, and the power is not applied to the driven shaft until such links are tightened by twisting. I attach such links to a movable brake-shoe on the driven shaft, so that the movement of such links withdraws the movable shoe from a stationary brake-shoe, against which it is otherwise held by a spring. When the application of power from the driving-shaft ceases, the tension on the links is thus removed, and the spring moves the brake-shoe forward and untwists the links, so that the driven machine is braked and disconnected from the driving-shaft at the same time.

My invention is illustrated in the accompanying drawing, which is a longitudinal section of the apparatus.

A is the driving-shaft, and B represents a pulley or other device by which said shaft is connected with the driving-motor, which may be an electric motor or other engine. Upon the shaft A is keyed a sleeve C, having a projecting flange D.

E is the driven shaft intended to be rotated by the power applied to the shaft A. Upon the shaft E is a pulley F or other gearing for applying such power to a driven machine. Also upon the shaft E is keyed a sleeve G, arranged to move longitudinally upon the shaft, and formed or provided at one end with a brake-shoe H. Between the shoe H and a flange I on the shaft is placed a spiral spring K. I prefer to place a washer L, made of leather or other suitable material, upon the shaft E, so that such washer is interposed between the flange I and the end of the sleeve C which bears loosely upon the end of shaft E.

M is a stationary brake-shoe attached to the pedestal N, or placed in any other convenient position so as to be engaged by the brake-shoe H. The flange D of the sleeve C is connected with the brake-shoe H by links O O, of which there may be any required number, two being shown for convenience of illustration.

In operation, when the shaft A is started, the parts being in the position shown, with the brake-shoes in contact, the first turning movement of the shaft A causes the links O to be turned or twisted, and this movement draws the brake-shoe H away from the stationary shoe M and so releases the driven shaft E, and when the links O are turned sufficiently the brake-shoe H and the shaft E will be turned, and the power will be communicated to the machine driven by said shaft. When the application of power to the shaft A is discontinued, the tension of such shaft is removed from the links O, and the spring K, therefore, pushes the brake-shoe H forward into engagement with the stationary shoe M, so that the driven shaft is immediately braked, and the apparatus is in position for starting again.

In the use of my invention with electric-railway cars or other apparatus in which the driven machine sometimes runs by its own momentum, as when a car is running on a downgrade, it will be seen that the current being shut off from the driving-motor the brake will be applied automatically so as to retard the speed of the car, and the tension of the links will so adjust itself as to bring the brake-shoes into the required degree of contact to properly retard the speed according to the relative speed of the two shafts, so that the braking of the driven machine or the car will be automatically adjusted as to the speed required. In starting, as will be seen, the first application of power results only in the twisting of the links, so that the full load is not applied at once to the driving-motor; but the same is allowed to work at first with a light load, which gradually increases. This is a matter of especial advantage with electric motors, since it enables the armature to begin to revolve, and thus develop speed and counter-electro-motive force before the load is put upon it.

What I claim is—

1. The combination of a driving-shaft, a driven shaft, and a torsionally-yielding connection between them, consisting of a loose link connected with both shafts, substantially as set forth.

2. The combination of a driving-shaft, a driven shaft, and a loose torsionally-yielding link placed parallel to said shafts and connected at one end with the driving-shaft and at the other end with the driven shaft, substantially as set forth.

3. The combination of a driving-shaft, a driven shaft, a flange or collar fixed on each shaft, and loose torsionally-yielding links connecting said flanges or collars, substantially as set forth.

4. The combination of a driving-shaft, a driven shaft or body, and a brake for the latter controlled by the movement of the former, substantially as set forth.

5. The combination of a driving-shaft, a driven shaft or body, brake-shoes (one of which is movable) controlling the movement of said driven shaft or body, and a connection from the driving-shaft for operating the movable brake-shoe, substantially as set forth.

6. The combination of a driving-shaft, a driven shaft, a stationary brake-shoe, a movable brake-shoe on the driven shaft, and a connection from the driving-shaft to said brake-shoe, whereby the same is moved by the turning of the driving-shaft, substantially as set forth.

7. The combination of a driving-shaft, a driven shaft, a stationary brake-shoe, a movable brake-shoe on the driven shaft, and a loose link connecting the movable brake-shoe with the driving-shaft, substantially as set forth.

8. The combination of a driving-shaft, a driven shaft, a stationary brake-shoe, a sliding brake-shoe keyed on the driven shaft, and a loose connection from said driving-shaft to said brake-shoe, substantially as set forth.

9. The combination of a driving-shaft, a driven shaft, a stationary brake-shoe, a sliding brake-shoe keyed to the driven shaft, a loose connection from said driving-shaft to said brake-shoe, and a spring for moving said brake-shoe toward the stationary one, substantially as set forth.

10. The combination of a driving-shaft, a driven shaft, a stationary brake-shoe, a sliding brake-shoe keyed to the driven shaft, a flange or collar on the driving-shaft, and links connecting said flange or collar with said movable brake-shoe, substantially as set forth.

11. The combination of a driving-shaft, a driven shaft, a stationary brake-shoe, a sliding brake-shoe keyed to the driven shaft, a flange or collar on the driving-shaft, links connecting said flange or collar with said movable brake-shoe, and a spring for moving said brake-shoe toward the stationary one, substantially as set forth.

This specification signed and witnessed this 30th day of January, 1890.

CHARLES R. PRATT.

Witnesses:
W. PELZER,
D. H. DRISCOLL.